United States Patent [19]
Vasquez

[11] Patent Number: 5,930,343
[45] Date of Patent: Jul. 27, 1999

[54] TOLL CALL RATE PROVIDER

[75] Inventor: Silverio Cajigas Vasquez, Westminster, Colo.

[73] Assignee: Lucent Technologies Inc., Murray Hill, N.J.

[21] Appl. No.: 08/975,879

[22] Filed: Nov. 21, 1997

Related U.S. Application Data

[63] Continuation of application No. 08/573,607, Dec. 15, 1995, abandoned, which is a continuation of application No. 08/218,556, Mar. 28, 1995, abandoned.

[51] Int. Cl.⁶ .......................... H04M 1/64; H04M 15/00
[52] U.S. Cl. .................. 379/115; 379/67.1; 379/112; 379/130; 379/201; 379/207; 379/214; 379/216; 379/218
[58] Field of Search ..................... 379/67.1, 112, 379/113, 114, 115, 130, 201, 207, 214, 216, 218

[56] References Cited

U.S. PATENT DOCUMENTS

| | | | |
|---|---|---|---|
| 3,769,463 | 10/1973 | Graham et al. | 179/7.1 TP |
| 4,151,372 | 4/1979 | Fitts, III et al. | 179/7.1 R |
| 4,264,956 | 4/1981 | Delaney | 364/467 |
| 4,706,275 | 11/1987 | Kamil | 379/155 |
| 4,797,910 | 1/1989 | Daudlin | 379/67 |
| 4,813,065 | 3/1989 | Segala | 379/112 |
| 4,947,422 | 8/1990 | Smith et al. | 279/200 |
| 5,003,584 | 3/1991 | Benyacar et al. | 379/119 |
| 5,027,387 | 6/1991 | Moll | 379/225 |
| 5,068,891 | 11/1991 | Marshall | 379/91 |
| 5,185,781 | 2/1993 | Dowden | 379/100 |
| 5,187,710 | 2/1993 | Chau et al. | 379/115 |
| 5,199,062 | 3/1993 | Von Meister et al. | 379/205 |
| 5,204,894 | 4/1993 | Darden | 379/213 |
| 5,210,789 | 5/1993 | Jeffus et al. | 379/127 |
| 5,222,120 | 6/1993 | McLeod et al. | 379/201 |
| 5,333,180 | 7/1994 | Brown et al. | 379/79 |
| 5,333,186 | 7/1994 | Gupta | 379/114 |
| 5,396,342 | 3/1995 | Meyer | 358/406 |
| 5,400,395 | 3/1995 | Berenato | 379/130 |
| 5,473,630 | 12/1995 | Penzias et al. | 379/113 |
| 5,483,582 | 1/1996 | Pugh et al. | 379/112 |

FOREIGN PATENT DOCUMENTS

| 0051357 | 3/1985 | Japan | 379/88 |
|---|---|---|---|

OTHER PUBLICATIONS

IEEE Communications Magazine, Murphy et al, Automation of Alternate Billed Calls Using Speech Recognition, Jan. 1991.

*Primary Examiner*—Fan S. Tsang
*Assistant Examiner*—Allan Hoosain
*Attorney, Agent, or Firm*—John C. Moran

[57] ABSTRACT

Using designated special telephone numbers each associated with a particular language to provide rate information by a telecommunication switching system that responds to those special telephone numbers. When a caller calls one of the special numbers, the caller is requested in the correct language to enter the desired destination telephone number; and in return, the caller receives the cost for making a call to that number. If the caller wishes to place the call, the system automatically places the call. If the decision is made to place the call, an option allows the caller to specify the maximum amount of money they will spend. After this maximum amount of money is met, the system automatically disconnects the call. The system gives a warning at some predetermined interval before the call is disconnected. In addition to the rate information for making the call at the present time, system provides the caller with the cheapest time to make the call and the present time and day for the location of the destination telephone number.

20 Claims, 3 Drawing Sheets ll,930,343

TOLL CALL RATE PROVIDER

This application is a continuation of application Ser. No. 08/573,607, filed on Dec. 15, 1995, now abandoned which is a continuation of application Ser. No. 08/218,556, filed on Mar. 28, 1995, now abandoned.

TECHNICAL FIELD

The present invention relates in general to telecommunication methods and apparatus, and more particularly, relates to the provision of telephone rate information for long distance or toll telephone calls.

BACKGROUND OF THE INVENTION

Within the United States, many people are accustomed to making long distance personal telephone calls. Having made large numbers of long distance telephone calls, these people have a reasonable estimation of what the cost of a long distance telephone call will be for particular times of the day and destinations. However, most people have little idea of what the cost of making an international call is. In addition, there are other people who because of economic, cultural, or language differences have little idea how much it will cost to make a domestic or international telephone call. In addition, these people may have a very fixed amount of money that they have available to spend on a long distance telephone call.

One way for these people to overcome their problem, is to call a long distance operator of a long distance provider and request the rate information from that operator for a particular call. There is of course a language difficulty in obtaining this information; and in general, people are reluctant to request such information from another person.

In addition, devices are known which automatically provide the charges for a telephone call when connected with a telephone to a telephone line. U.S. Pat. No. 4,947,422 discloses such a device as does U.S. Pat. No. 4,091,238. The problem with such devices is that they must be pre-attached to the telephone line, and they only give information for the accumulated charge after the call has been placed.

SUMMARY OF THE INVENTION

The above problems are solved by an apparatus and method that use special telephone numbers each associated with a particular language to provide rate information. When a caller calls one of the special numbers, the caller is requested in the correct language to enter the desired destination telephone number; and in return, the caller receives the cost for making a call to that number. If the caller wishes to place the call, the system associated with the special number automatically places the call. If the decision is made to place the call, an option allows the caller to specify the maximum amount of money they will spend. After this maximum amount of money is met, the system automatically disconnects the call. Advantageously, the system would give a warning at some predetermined interval before the call was disconnected. In addition to the rate information for making the call at the present time, system provides the caller with the cheapest time to make the call and the present time and day for the location of the destination telephone number.

DETAILED DESCRIPTION

Figure 1:
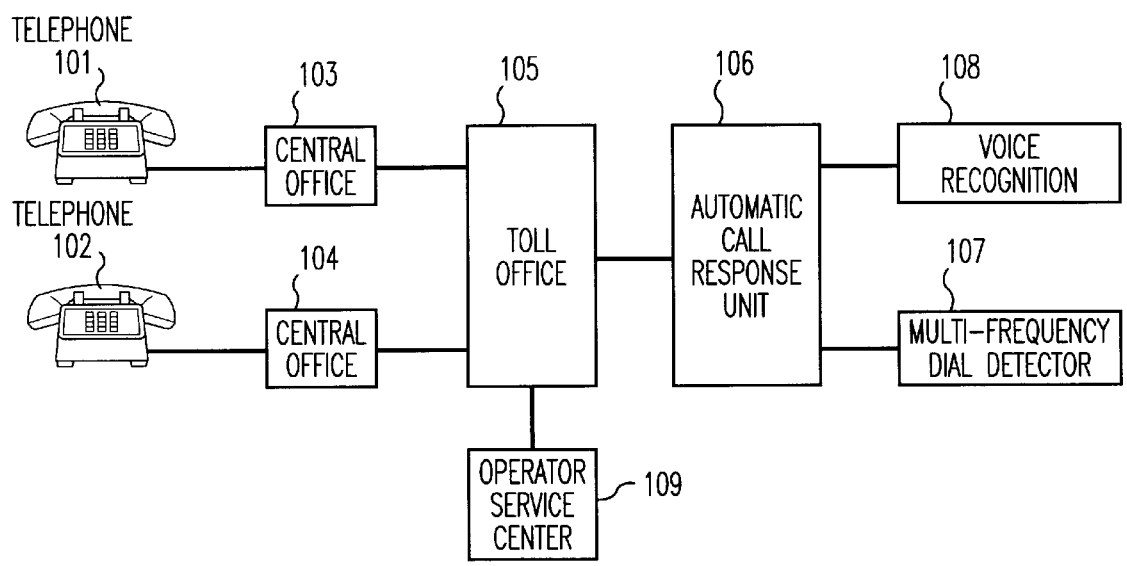
FIG. 1 illustrates a telecommunication system for implementing the invention.

To understand how the system of FIG. 1 functions, consider the following example. When the user of telephone 101 wishes to find out the cost of placing a telephone call to telephone 102, the user of telephone 101 first dials an 800 number associated with the language which the user wishes to use. Central office 103 recognizes the 800 prefix and refers this call to toll office 105. Toll office 105 then connects the user with automatic call response unit 106. Based on the dialed 800 number, automatic call response unit 106 requests in the chosen language that the user enter the destination telephone number. In the present example, that would be the telephone number of telephone 102. Once the destination telephone number is entered, automatic call response unit 106 verifies that this is a valid number and accesses a data base for the rate information for calling telephone 102 at this particular time of the day. Automatic call response unit 106 then plays an announcement of the rate information to the user of telephone 101. At this point in time the user can hang up or request that the call be connected. If the user decides that the call should proceed, automatic call response unit 106 then plays an announcement asking the user if they want to set a maximum dollar limit on the call. If the user desires to set a maximum limit, the user then enters this information. Automatic call response unit 106 then signals toll office 105 that the call is to be connected to telephone 102 and the maximum time limit of the call if the maximum dollar limit was entered by the user. The operation of automatic call response unit 106 with toll office 105 is similar to that described for the Conversant® Voice Information System in the article entitled "Where You Go So Go the Calls", AT&T Technology, Vol. 8, No. 3, Autumn 1993.

Figure 2:
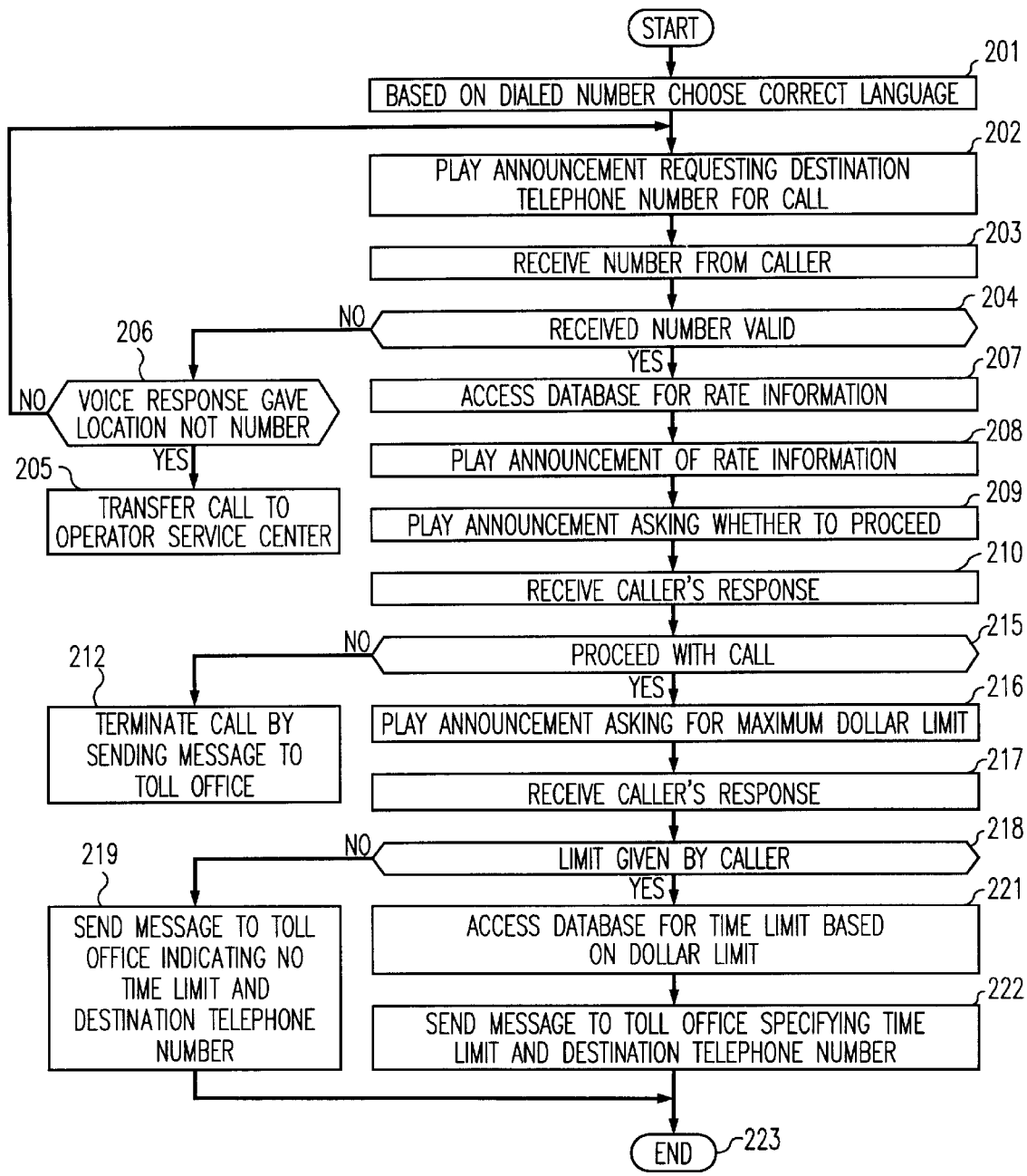
FIG. 2 illustrates, in flow chart form, the functions performed by an automatic call response unit.

FIG. 2 shows the functions performed by automatic call response unit 106. Unit 106 is responsive to the call being transferred from toll office 105 to examine the dialed 800 number in order to choose the correct language for interacting with the caller. Block 202 plays the announcement requesting the destination telephone number for the call that the caller wishes to place. Block 203 receives this number from the caller. This number can be spoken by the caller in which case voice recognition subunit 108 is used to determine the number or the number can be entered as multi-frequency dialing in which case multi-frequency detector 107 is utilized. Decision block 204 determines whether the number is a valid number. If the number is not valid, decision block 204 transfers control to decision block 206. If voice recognition unit 108 is being utilized to decode the number from the caller, decision block 206 determines whether a number was given or whether the caller was requesting location information. If the caller was requesting that the call to be placed to a specific location, control is transferred to block 205 which connects the caller to operator service center 109 via toll office 105. The operation of an operator service center, also referred to as operator services position system, is described in "Operator Services Position System", AT&T Technical Journal, November/December, 1989, Vol. 68, No. 6. If the caller was not requesting location information but had given incorrect numbers, control is transferred back to block 202. If the caller is using multi-frequency dialing to enter the number, control is always transferred from decision block 206 back to block 202.

If the decision in decision block 204 was yes, control is transferred to block 207. The latter block accesses an internal data base to obtain the rate information. Then, block 208 plays an announcement giving this rate information to the caller. In addition, the announcement gives the cheapest time to place the call and the time and day of the destination telephone. Control is then transferred to block 209 which plays an announcement asking the caller whether they want to proceed. Block 210 waits for the caller's response and transfers control to decision block 215.

Decision block 215 examines the caller's response in block 210 to determine whether the caller wishes to proceed with the call or not. If the caller does not wish to proceed, control is transferred to block 212 which terminates the call. If the caller indicates that they want to continue with the call, control is transferred to block 216. The latter block requests whether the caller wishes to set a maximum dollar limit on their call. Block 217 receives the caller's response and transfers control to decision block 218. If the user does not wish to place a maximum dollar limit on their call, control is transferred to block 219. Block 219 transmits a message to toll office 105 indicating that the call should be placed to the call destination number but that there is no time limit. If the answer is yes in decision block 218, control is transferred to block 221 which interrogates the data base to determine the time limit based on the dollar amount entered by the caller. Control is then transferred to block 222 which sends a message to toll office 105 indicating that the call is to be placed to the destination telephone number and also specifying the time limit on the call.

Figure 3:
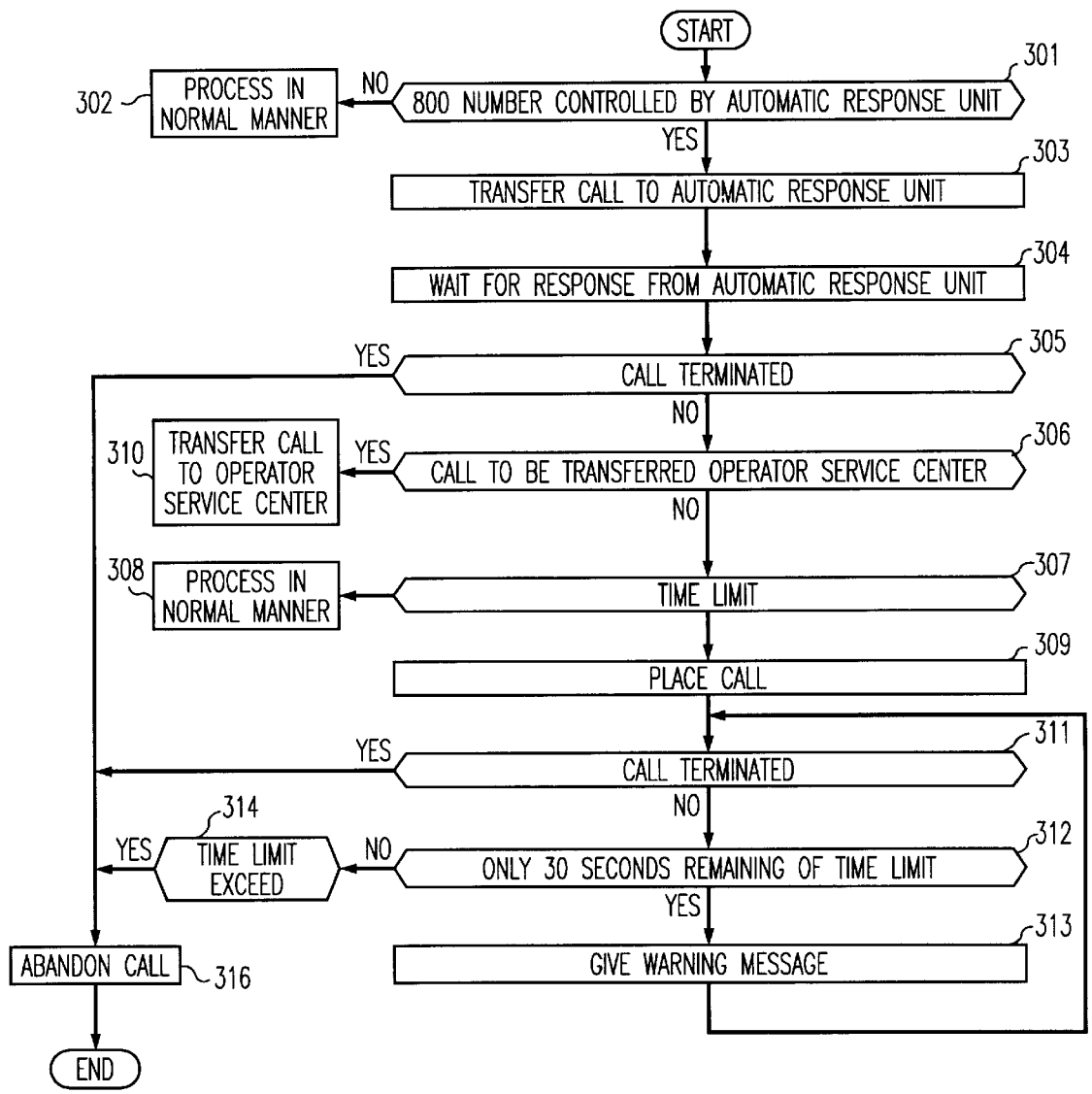
FIG. 3 illustrates in flow chart form, the functions performed by a toll office.

FIG. 3 shows in flow chart form the operations performed by toll office 105. Decision block 301 determines if the dialed 800 number is one controlled by automatic response unit 106. If the answer is no, control is transferred to block 302 which processes the call in the normal manner. If the result of decision block 301 is yes, control is transferred to block 303 which transfers the call to automatic response unit 106. Block 304 awaits a response from automatic response unit 106.

Once the response is received by block 304, control is transferred to decision block 305 which determines if the call has been terminated by the caller. If the answer is yes, control is transferred to block 316 which abandons the call.

If the answer in decision block 305 is no, control is transferred to decision block 306 which determines if the call is to be transferred to operator service center 109. If the call is not to be transferred to operator service center 109, control is transferred to decision block 307 which interrogates the message received from automatic response unit 106 to determine if there is a time limit. If there is no time limit, control is transferred to block 308 which processes the call in the normal manner by placing the call to the telephone number determined by the received destination telephone number.

If there is a time limit, control is transferred from decision block 307 to block 309 which places the call. Decision blocks 311, 312, and 314 then determine when the call is to be terminated and control is transferred to block 316 to abandon the call. Decision block 311 determines whether the call has been terminated by caller or called party, and if the call has been terminated, control is transferred to block 316. If the call has not been terminated, control is transferred to decision block 312. Decision block 312 determines when there is only 30 seconds remaining in the time limit. When only 30 seconds are remaining, control is transferred to block 313 which transmits a warning message to the caller. This warning message advantageously may be a tone but one skilled in the art could see that a voice message could also be used. If there is not 30 seconds remaining in the time limit, control is transferred by decision block 312 to decision block 314 which determines if the time limit has been exceeded. If the answer is no, control is transferred back to decision block 311.

It is to be understood that the above-described embodiments are merely illustrative of the principles of the invention and that other arrangements may be devised by those skilled in the art without departing from the spirit or scope of the invention. In particular, one skilled in the art would realize that the various voice messages communicated from automatic call response unit 106 to the caller could be of another format such as text messages or for certain messages simple audio tones.

I claim:

1. A method of providing telephone rate information by a telecommunication switching system, comprising the steps of:
   receiving a telephone call from a calling telephone directed to a special telephone number that is available to any human caller to obtain rate information for a destination telephone number designated by the human caller wherein the special number is not for the exclusive use of one individual;
   automatically transmitting first signals to request the destination telephone number from the human caller;
   automatically transmitting second signals based on the destination telephone number to provide rate information for the cost in currency of placing a telephone call from the calling telephone to a telephone identified by the destination telephone number to the human caller;
   automatically routing the telephone call to the destination telephone number.

2. The method of claim 1 wherein the step of routing comprises the step of automatically transmitting third signals to the human caller to request that the human caller indicate a desire to proceed in calling the destination telephone number and upon receipt of an indication from the human caller to proceed with the telephone call to route the telephone call to the destination telephone number.

3. The method of claim 2 wherein the first, second, and third signals are first, second, and third messages, respectively, and are transmitted as audio messages.

4. The method of claim 3 further comprises the step of determining from the special telephone number a language to be used for the audio messages.

5. The method of claim 4 wherein the second message further comprises time and day information for an area where a telephone identified by the destination telephone number is located.

6. The method of claim 4 wherein the second message further comprises an announcement of the cheapest time of day to call the destination telephone number.

7. The method of claim 1 further comprises the step of transmitting fourth signals to the human caller to request that the human caller enter a maximum amount of money in currency to be spent in calling the destination telephone number; and
   the step of routing further comprises the step of disconnecting the call when the maximum amount of money has been spent.

8. An apparatus for providing telephone rate information by a telecommunication switching system, comprising:
   means for receiving a telephone call from a calling telephone directed to a special telephone number that is available to any human caller to obtain rate information for a destination telephone number designated by the human caller wherein the special number is not for the exclusive use of one individual;

means for automatically transmitting first signals to request the destination telephone number from the human caller;

means for automatically transmitting second signals based on the destination telephone number to provide rate information for the cost in currency of placing a telephone call from the calling telephone to a telephone identified by the destination telephone number to the human caller;

means for automatically routing the telephone call to the destination telephone number.

9. The apparatus of claim 8 wherein the routing means comprises means for automatically transmitting third signals to the human caller to request that the human caller indicate a desire to proceed in calling the destination telephone number and upon receipt of an indication from the human caller to proceed with the telephone call to route the telephone call to the destination telephone number.

10. The apparatus of claim 9 wherein the means for transmitting the first signals transmits those signals as a first audio message, the means for transmitting the second signals transmits those signals as a second audio message, and the means for transmitting the third signals transmits those signals as a third audio message.

11. The apparatus of claim 10 further comprises means for determining from the special telephone number a language to be used for the audio messages.

12. The apparatus of claim 11 wherein the second message further comprises time and day information for an area where a telephone identified by the destination telephone number is located.

13. The apparatus of claim 11 wherein the second message further comprises an announcement of the cheapest time of day to call the destination telephone number.

14. The apparatus of claim 8 further comprises means for transmitting fourth signals to the human caller to request that the human caller enter a maximum amount of money in currency to be spent in calling the destination telephone number; and the means for routing further comprises means for disconnecting the call when the maximum amount of money has been spent.

15. An automatic response unit for providing telephone rate information and the automatic response unit is connected to a telecommunication switching system, the automatic response unit comprising:

means for receiving a telephone call from a calling telephone directed to a special telephone number that is available to any human caller to obtain rate information for a destination telephone number designated by the human caller from the telecommunication switching system wherein the special number is not for the exclusive use of one individual;

means for automatically transmitting a first message to request the destination telephone number from the human caller;

means for automatically transmitting a second message based on the destination telephone number to provide rate information for the cost in currency of placing a telephone call from the calling telephone to a telephone identified by the destination telephone number to the human caller;

means for automatically transmitting a third message to the human caller to request that the human caller indicate a desire to proceed in calling the destination telephone number; and means for automatically transmitting a control message to the telecommunication switching system to request that telecommunication switching system route the telephone call to the destination telephone number upon receipt of an indication from the human caller to proceed with the telephone call.

16. The automatic response unit of claim 15 further comprises an automatic voice response unit and the first, second, and third messages are audio messages.

17. The automatic voice response unit of claim 16 further comprises means for determining from the special telephone number a language to be used for the messages.

18. The automatic voice response unit of claim 17 wherein the second message further comprises time and day information for an area where a telephone identified by the destination telephone number is located.

19. The automatic voice response unit of claim 17 wherein the second message further comprises an announcement of the cheapest time of day to call the destination telephone number.

20. The automatic voice response unit of claim 16 further comprises means for transmitting a fourth message to the human caller to request that the human caller enter a maximum amount of money in currency to be spent in calling the destination telephone number;

the means for transmitting the control message comprises means for determining a maximum amount of time for the call based on the maximum amount of money; and means for inserting the maximum amount of time into the control message transmitted to the telecommunication switching system whereby the telecommunication switching system well disconnect the call when the maximum amount of time has been exceed by the call.

* * * * *